(12) United States Patent
Hu

(10) Patent No.: US 7,775,487 B2
(45) Date of Patent: Aug. 17, 2010

(54) FOLDABLE SUPPORTING STAND WITH POSITIONING MEANS

(75) Inventor: Chung-Cheng Hu, Banciao (TW)

(73) Assignee: Syncmold Enterprise Corp., Taipei County (TW)

( * ) Notice: Subject to any disclaimer, the term of this patent is extended or adjusted under 35 U.S.C. 154(b) by 0 days.

(21) Appl. No.: 12/232,023

(22) Filed: Sep. 10, 2008

(65) Prior Publication Data

US 2010/0059647 A1    Mar. 11, 2010

(51) Int. Cl.
*F16M 11/00* (2006.01)

(52) U.S. Cl. .................... 248/157; 248/346.06; 248/917

(58) Field of Classification Search ............ 248/346.06, 248/157, 161, 404, 412, 414, 159, 917, 919, 248/150, 149, 354.1, 354.6, 354.7; 361/679.21, 361/679.08, 679.61, 678
See application file for complete search history.

(56) References Cited

U.S. PATENT DOCUMENTS

| | | | |
|---|---|---|---|
| 6,381,125 B1 * | 4/2002 | Mizoguchi et al. ..... | 361/679.08 |
| 6,905,099 B2 * | 6/2005 | Sung ........................... | 248/146 |
| 6,994,303 B2 * | 2/2006 | Lin et al. .................. | 248/122.1 |
| 7,124,984 B2 * | 10/2006 | Yokouchi et al. .......... | 248/125.8 |
| 7,431,254 B2 * | 10/2008 | Cheng .................... | 248/292.12 |
| 7,490,796 B2 * | 2/2009 | Kim ........................... | 248/157 |
| 7,497,408 B2 * | 3/2009 | Lim et al. ................ | 248/284.1 |
| 2007/0262210 A1 * | 11/2007 | Oh et al. .................. | 248/125.1 |

* cited by examiner

*Primary Examiner*—Anita M King
(74) *Attorney, Agent, or Firm*—Rosenberg, Klein & Lee

(57) ABSTRACT

A foldable supporting stand with a positioning mechanism includes a base, a support, a sliding body, a positioning mechanism, and a swinging piece. The support is roatably pivoted to the base. The sliding body is slidably provided on the support and is further connected to a screen. The swinging piece is swingably connected to the positioning mechanism. The positioning mechanism is fixed in the support. When the support is folded in the base, the swinging piece swings toward the sliding body due to its own weight, and is then locked with the sliding body. The locked sliding body is restricted from sliding on the support, so that the screen is thus kept stationary. By that arrangement, the supporting stand has a reduced volume for efficient packaging and storage. Furthermore, the screen is held stationary when being transported.

11 Claims, 8 Drawing Sheets

FOLDABLE SUPPORTING STAND WITH POSITIONING MEANS

BACKGROUND OF THE INVENTION

1. Field of the Invention

The present invention relates to a supporting device, and in particular to a foldable supporting stand having a positioning means; wherein by virtue of its design, when a user folds the supporting stand, the positioning means within the supporting stand can be locked with each other via its own weight, thereby fixing a screen connected on the supporting stand.

2. Description of Related Art

The current panel display is usually oriented upright via a supporting stand, so that a user can view the panel display conveniently. Since the supporting stand can be lifted up or lowered, the user can adjust the height of the panel display according to practical demands. Please refer to FIG. 1, which shows a liftable supporting stand assembly for a display. The supporting stand assembly for the display includes a base 1a, a supporting stand 2a connected to the base 1a, and a positioning element 3a. The supporting stand 2a has a first connecting portion 21a and a second connecting portion 22a. The first connecting portion 21a is provided with a positioning hole 211a, and the second connecting portion 22a is provided with a plurality of equidistant fixing holes 221a. The first connecting portion 21a is moveably connected to the second connecting portion 22a. One end of the first connecting portion 21a is further connected to a panel display 4a, while one end of the second connecting portion 22a is connected to the base 1a. According to the desired height, the user selectively inserts the positioning element 3a into the positioning hole 211a and the fixing holes 221a, thereby fixing the first connecting portion 21a. In this way, the panel display 4a can be lifted up or lowered.

However, when a user needs to store the supporting stand 2a and the panel display 4a, the user has to fold the supporting stand 2a, and then inserts the positioning element 3a into the positioning holes 211a and the fixing holes 221a, thereby fixing the panel display 4a (FIG. 2). If the user forgets to insert the positioning element 3a into the positioning hole 211a and the fixing holes 221a, the panel display 4a may move on the supporting stand 2a arbitrarily. As a result, not only the package volume is increased, but also the probability of damaging the panel display 4a during its transportation is increased.

According to the above, the conventional supporting stand assembly has drawbacks as follows.

(I) The user has to manually insert the positioning element 3a into the positioning holes 211a and the fixing holes 221a so as to fix the panel display 4a. Thus, it is very inconvenient in use.

(II) The positioning element 3a may slightly protrude from the supporting stand 2a, so that the visual effect of the whole supporting stand 2a will be affected.

(III) Since the positioning element 3a is used for fixation, a gap has to be kept between the first connecting portion 21a and the second connecting portion 22a, thereby satisfying the requirement for the movement there-between. Therefore, the first connecting portion 21a may shake and swing when moving due to the gap, so that it may suffer damage after using for a period of time.

Consequently, because of the above limitation resulting from the technical design of prior art, the inventor strives via real world experience and academic research to develop the present invention, which can effectively improve the limitations described above.

SUMMARY OF THE INVENTION

The object of the present invention is to provide a foldable supporting stand with positioning means. The supporting stand can be folded by a user easily, thereby reducing its volume for package.

The other object of the present invention is to provide a foldable supporting stand with positioning means. With its own weight driving an internal structure of the supporting stand to fix a screen on the supporting stand, the screen can be avoided from moving to suffer damage, thereby reducing the probability of damaging the screen.

In order to achieve the above objects, the present invention provides a foldable supporting stand with positioning means, which includes a base, a support rotatably pivoted to the base; a sliding body slidably provided on the support, the sliding body having a stopping portion; a positioning means located between the sliding body and the support, the positioning means being fixedly joined in the support; and a swinging piece swingably connected to the positioning means, wherein the swinging piece selectively locks the stopping portion, thereby restricting the sliding body form sliding.

Preferably, the swinging piece has a restricting slope and an abutting portion. The restricting slope is provided on one end of the swinging piece at a specific angle, while the abutting end is located on the other end of the swinging piece. The abutting portion selectively locks the stopping portion, thereby restricting the sliding of the sliding body. The restricting slope selectively abuts the positioning means and thus restricts the swinging range of the swinging piece according to the specific angle.

The foldable supporting stand with positioning means of the present invention has advantageous features as follows.

(I) With its own weight serving as a driving force, the swinging piece is driven to swing and lock the sliding body, so that it is not necessary to use a complicated means to achieve the locking action.

(II) When the packaging process is performing, the foldable supporting stand with positioning means of the present invention can fix the screen, the screen can be prevented from shaking to suffer damage during its transportation.

(III) The foldable supporting stand with positioning means of the present invention merely utilizes simple means and uses its own weight as a driving force to restrict the movement of the screen. Therefore, the manufacturing cost is lower.

(IV) The foldable supporting stand with positioning means of the present invention can be operated easily and conveniently. Thus, it is of good practicability.

(V) The foldable supporting stand with positioning means of the present invention can save the manufacturing cost and reduce the time for assembling efficiently.

(VI) The foldable supporting stand with positioning means of the present invention can reduce the volume for packaging greatly. Not only the expense of packaging materials can be saved, but also the quantity of the supporting stands transported can be increased due to its reduced volume.

In order to further understand the characteristics and technical contents of the present invention, a detailed description relating thereto will be made with reference to the accompanying drawings. However, the drawings are illustrative only, but not used to limit the scope of the present invention.

DETAILED DESCRIPTION OF PREFERRED EMBODIMENTS

Figure 1:
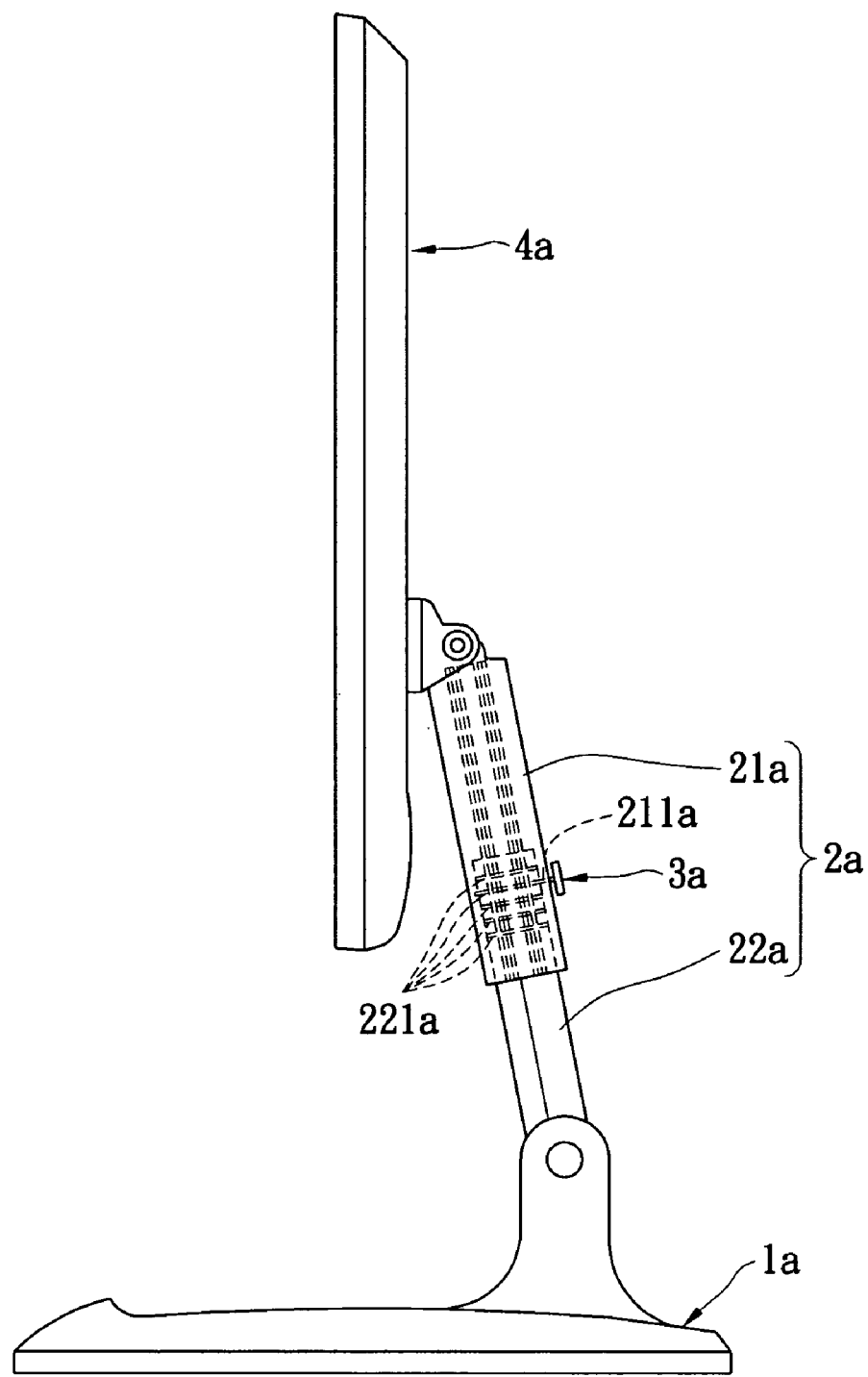
FIG. 1 is a schematic view showing a conventional supporting stand.
Figure 2:
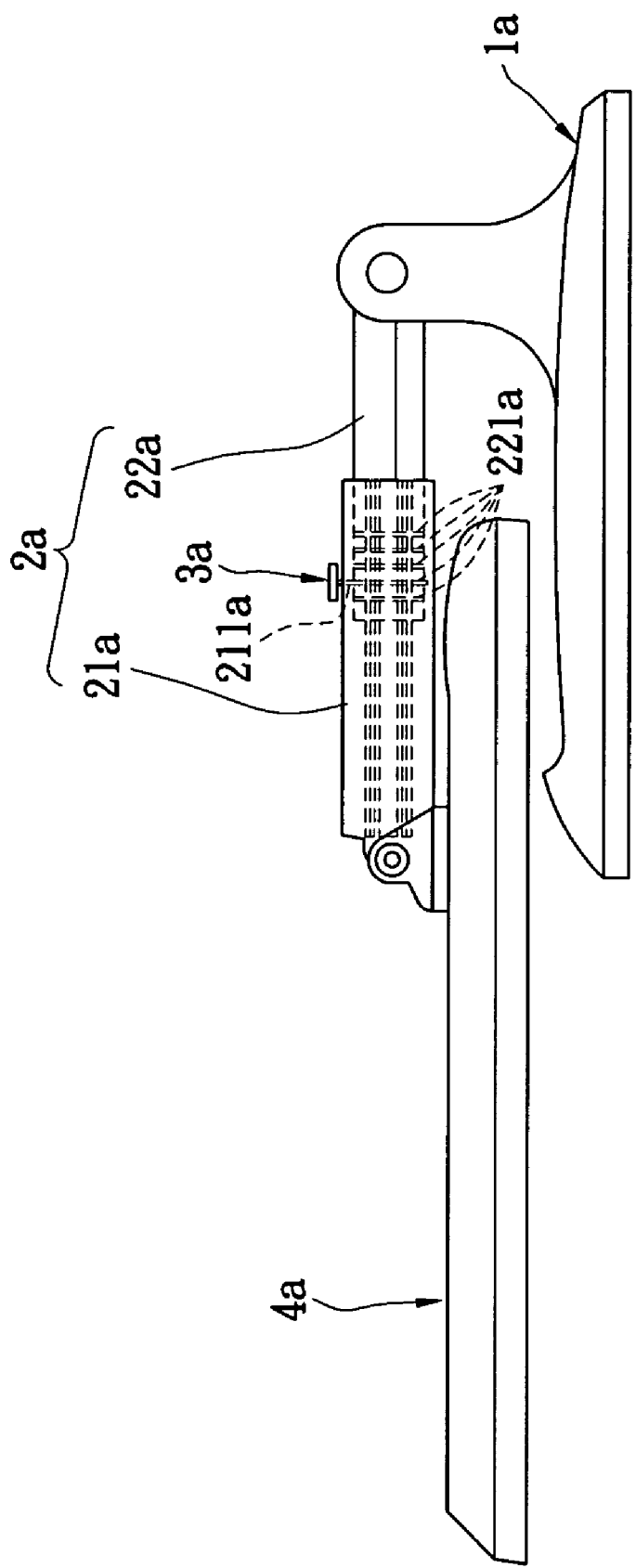
FIG. 2 is a schematic view showing the folded state of a conventional supporting stand.
Figure 3:
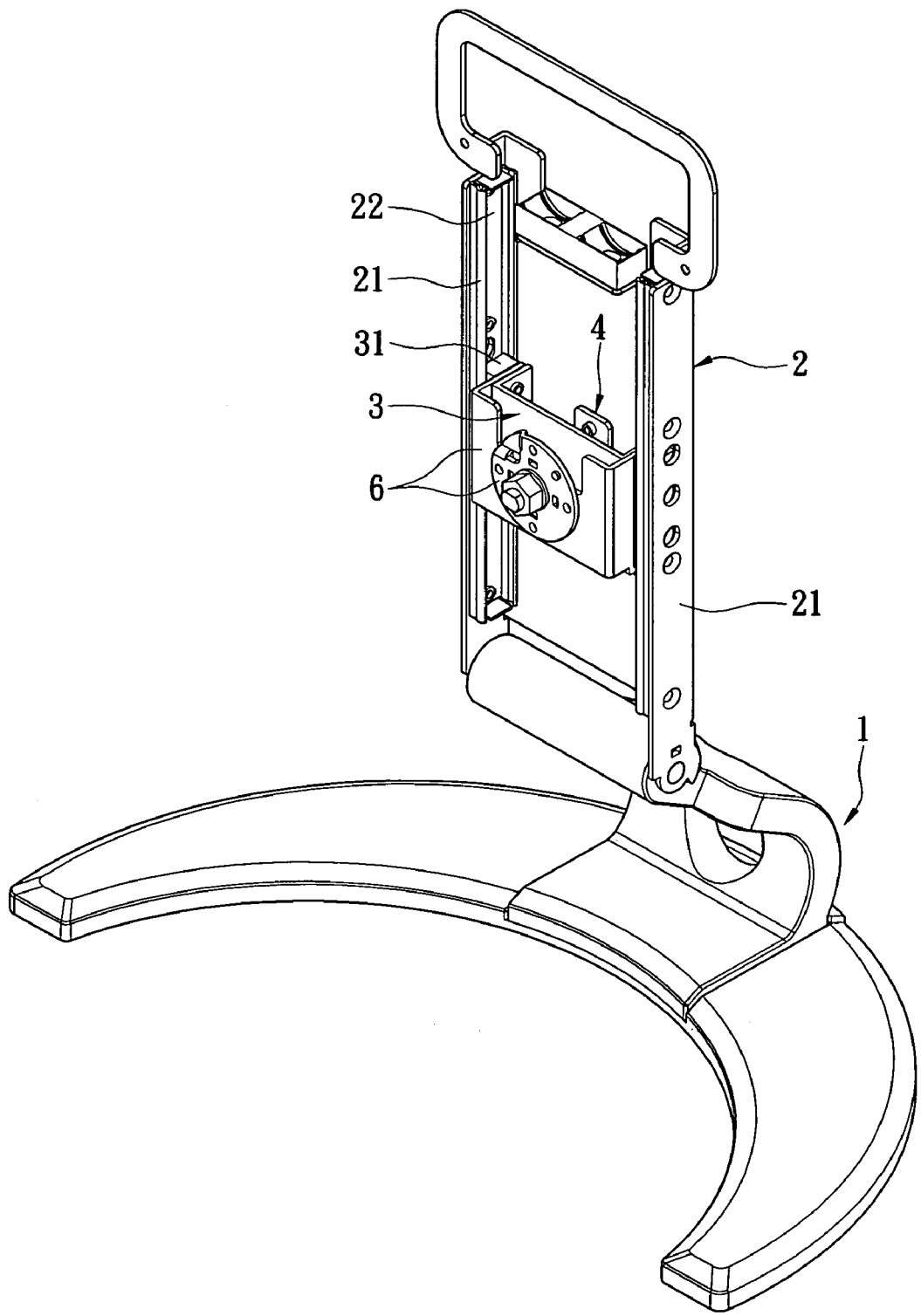
FIG. 3 is a perspective view of the foldable supporting stand with positioning means according to the present invention.
Figure 4A:
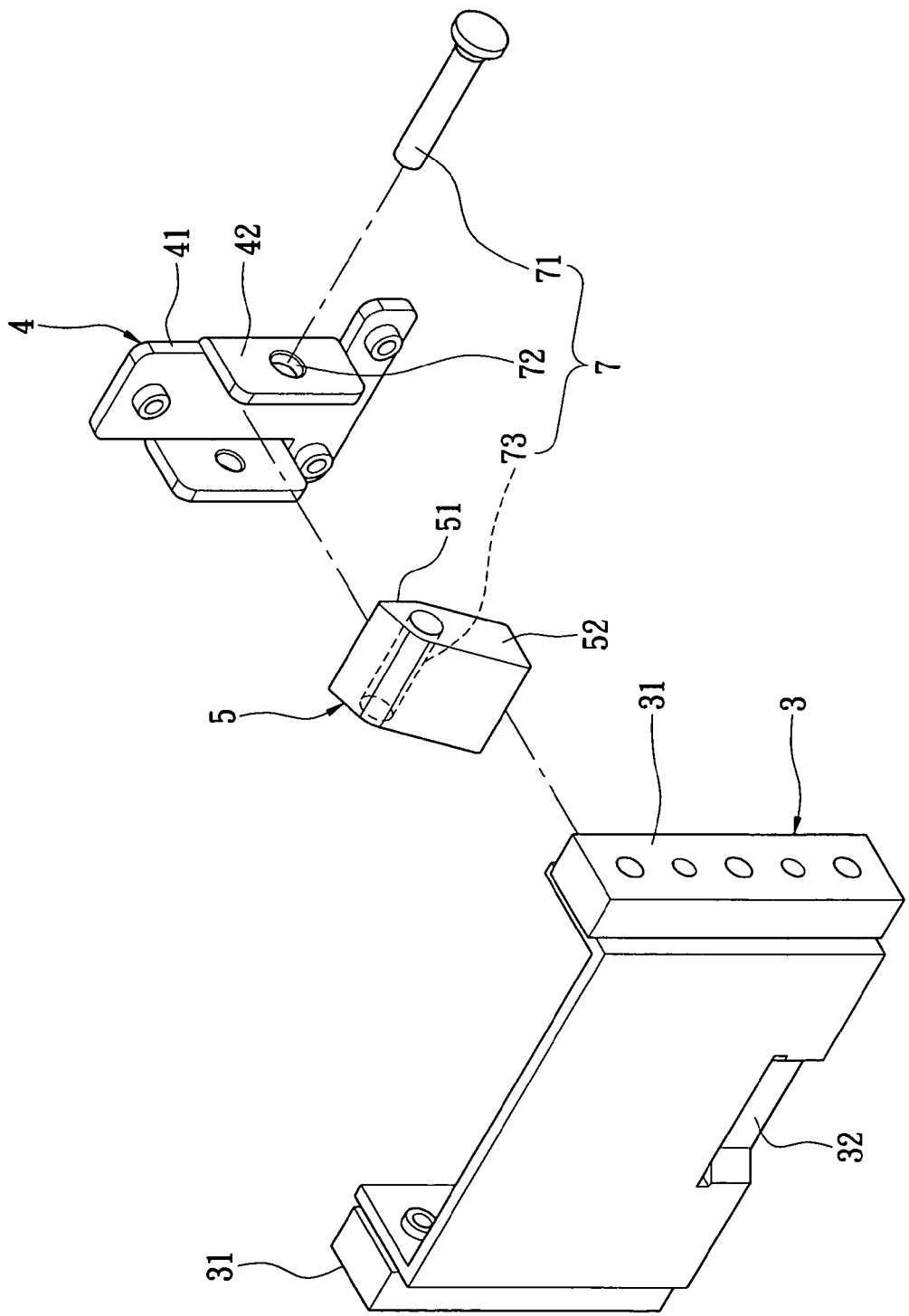
FIG. 4A is a partially enlarged view of the foldable supporting stand with positioning means according to the present invention.
Figure 4B:
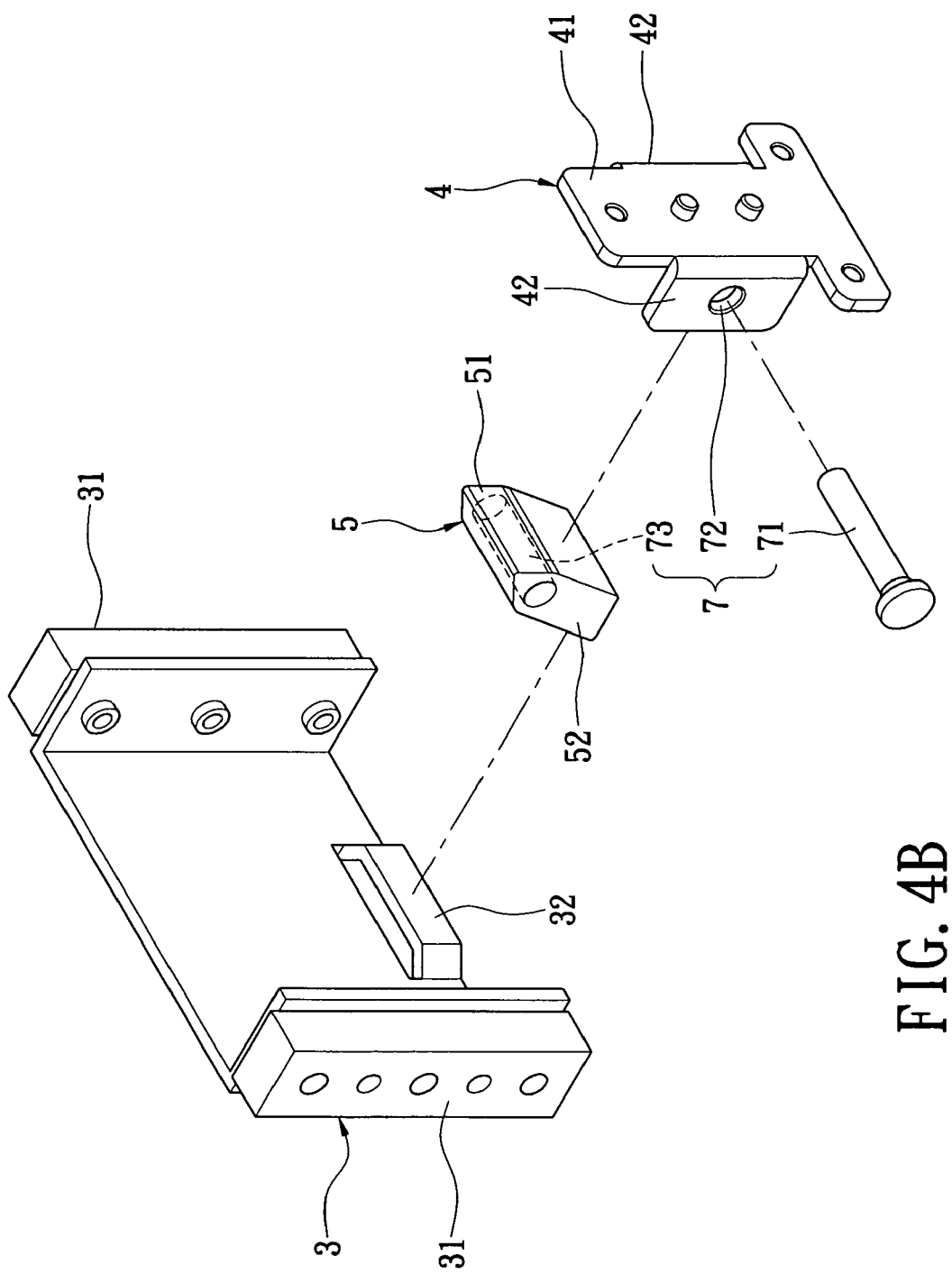
FIG. 4B is a partially enlarged view of the foldable supporting stand with positioning means according to the present invention from another angle.

Please refer to FIG. 3. The present invention provides a foldable supporting stand with positioning means, which includes a base 1, a support 2, a sliding body 3, a positioning means 4, and a swinging piece 5 (FIGS. 4A and 4B). One end of the support 2 can be rotatably pivoted to the base 1, so that it can be balanced by the base 1 firmly. The sliding body 3 is slidably provided on the support 2, so that the user can move the sliding body 3 arbitrarily according to practical demands. The positioning means 4 is fixed in the support 2. The swinging piece 5 is swingably connected on the positioning means 4. The positioning means 4 and the swinging piece 5 are located between the support 2 and the sliding body 3.

The support 2 has two bent plates 21 and two grooves 22. The two bent plates 21 extend from left and right sides of the support 2 respectively, and the two bent plates 21 form the two grooves 22.

The sliding body 3 is provided with at least two sliding blocks 31. The two sliding blocks 31 are provided on the left and right sides of the sliding body 3. With the two sliding blocks 31 being movably inserted into the grooves 22 of the support 2, the sliding body 3 can slide arbitrarily. On the other hand, the number of the sliding blocks 31 is not limited. In the present embodiment, there are two sliding blocks 31.

Please refer to FIGS. 4A and 4B. The sliding body 3 has a stopping portion 32. The stopping portion 32 is located on the swinging path of the swinging piece 5. The stopping portion 32 generates a restricting and fixing effect. That is, when the stopping portion 32 of the sliding body 3 is locked with the swinging piece 5, the positioning means 4 is fixed in the support 2 because the swinging piece 5 is located in the positioning means 4. Therefore, the sliding body 3 can be restricted by the swinging piece 5 without moving arbitrarily. Furthermore, the stopping portion 32 of the sliding body 3 can be a protruding block (not shown) provided on the sliding body 3, or a protruding plate (not shown) integrally extending from the sliding body 3. More specifically, any one element can be considered as the stopping portion 32 of the sliding body 3 as long as it can generate a fixing action.

Please refer to FIG. 3. In order to mount a screen (not shown) on the sliding body 3, the sliding body 3 is further provided with a screen fixing piece 6. The screen fixing piece 6 is connected between the screen (not shown) and the sliding body 3, so that the screen fixing piece 6 can move together with the sliding of the sliding body 3, which also causes the screen (not shown) to move accordingly. Therefore, the user can adjust the height of the screen (not shown) according to his/her habit.

Please refer to FIGS. 4A and 4B. The positioning means 4 includes a substrate 41 and two plates 42. The substrate 41 is fixed in the support 2. The two plates 42 are provided on the left and right sides of the substrate 41 respectively and extend from both sides of the substrate 41 toward the sliding body 3. The substrate 41 and the two plates 42 can be integrally formed into a unit, or they can be separately provided and connected to each other. In the present embodiment, the substrate 41 and the two plates 42 are integrally formed into a unit.

Further, a connecting means 7 is provided between the positioning means 4 and the swinging piece 5. The connecting means 7 is connected to the positioning means 4 and the swinging piece 5. The swinging piece 5 is swingably connected to the connecting means 7. The connecting means 7 has a rod 71, two through holes 72, and a penetrating hole 73. The plates 42 on the left and right sides of the positioning means 4 are provided with the through holes 72 respectively. The swinging piece 5 is provided with the penetrating hole 73. The rod 71 is disposed in the swinging piece 5 via the penetrating hole 73. Both sides of the swinging piece 5 protrude from both ends of the rod 71. Both ends of the rod 71 are fixed into the through holes 72 of the two plates 42 respectively. With the above connecting means, the swinging piece 5 swings by means of using the rod 71 as a supporting shaft.

Figure 5B:
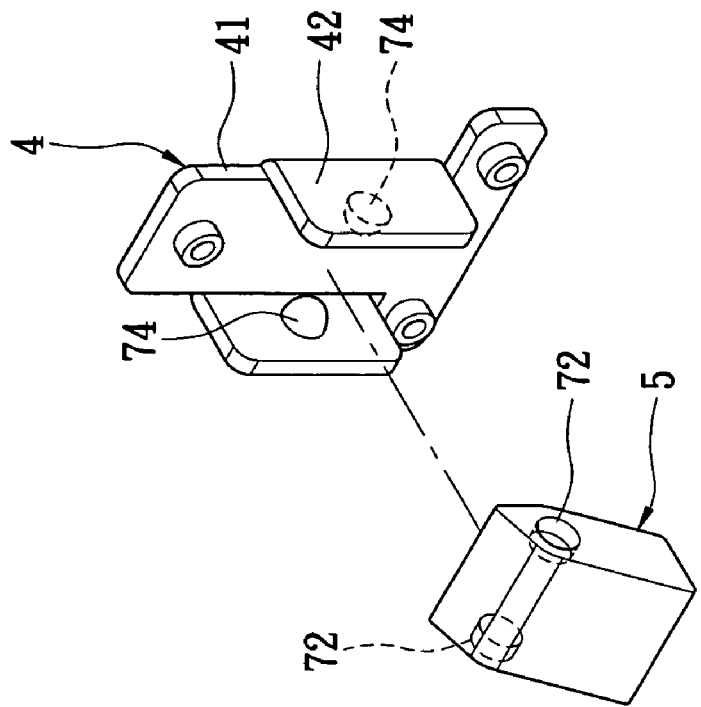
FIG. 5B is a schematic view showing another form of connection of the foldable supporting stand with positioning means according to the present invention.
Figure 5A:
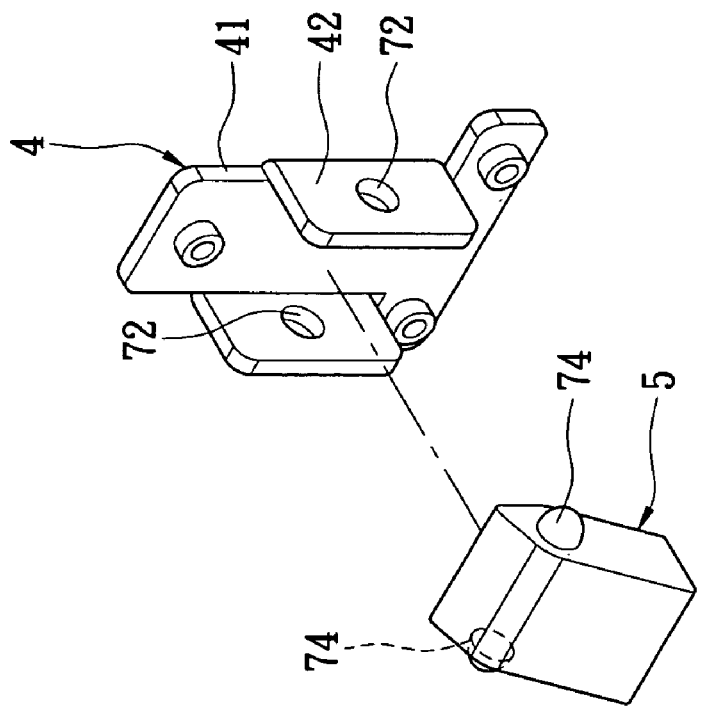
FIG. 5A is a schematic view showing a form of connection of the foldable supporting stand with positioning means according to the present invention.

Please refer to FIG. 5A. The connecting means 7 can be two protrusions 74 and two associated through holes 72. The two through holes 72 are provided on the two plates 42 of the positioning means 4 respectively. The two protrusions 74 extend from both sides of the swinging piece 5. The two protrusions 74 are rotatably connected to the two through holes 72, so that the swinging piece 5 can swing by means of using the two protrusions 74 as a supporting point. Further, as shown in FIG. 5B, the connecting means 7 can still be the two through holes 72 and the two protrusions 74. The only difference lies in that the two through holes 72 penetrate both sides of the swinging piece 5 respectively, while the two protrusions 74 extend from the two plates 42 of the positioning means 4. The two protrusions 74 are rotatably connected to the two through holes 72. In this way, the swinging piece 5 can swing similarly.

The swinging piece 5 has a restricting slope 51 and an abutting portion 52. The restricting slope 51 and the abutting portion 52 are located on both ends of the swinging piece 5 respectively. The restricting slope 51 is provided on one end of the swinging piece 5 at a specific angle, and abuts the substrate 41 of the positioning means 4 selectively. Via this arrangement, when the restricting slope 51 abuts the substrate 41 of the positioning means 4, the restricting slope 51 can provide a force for supporting the swinging piece 5. Further, the restricting slope 51 can restrict the swinging range of the swinging piece 5 based on the specific angle.

Figure 6A:
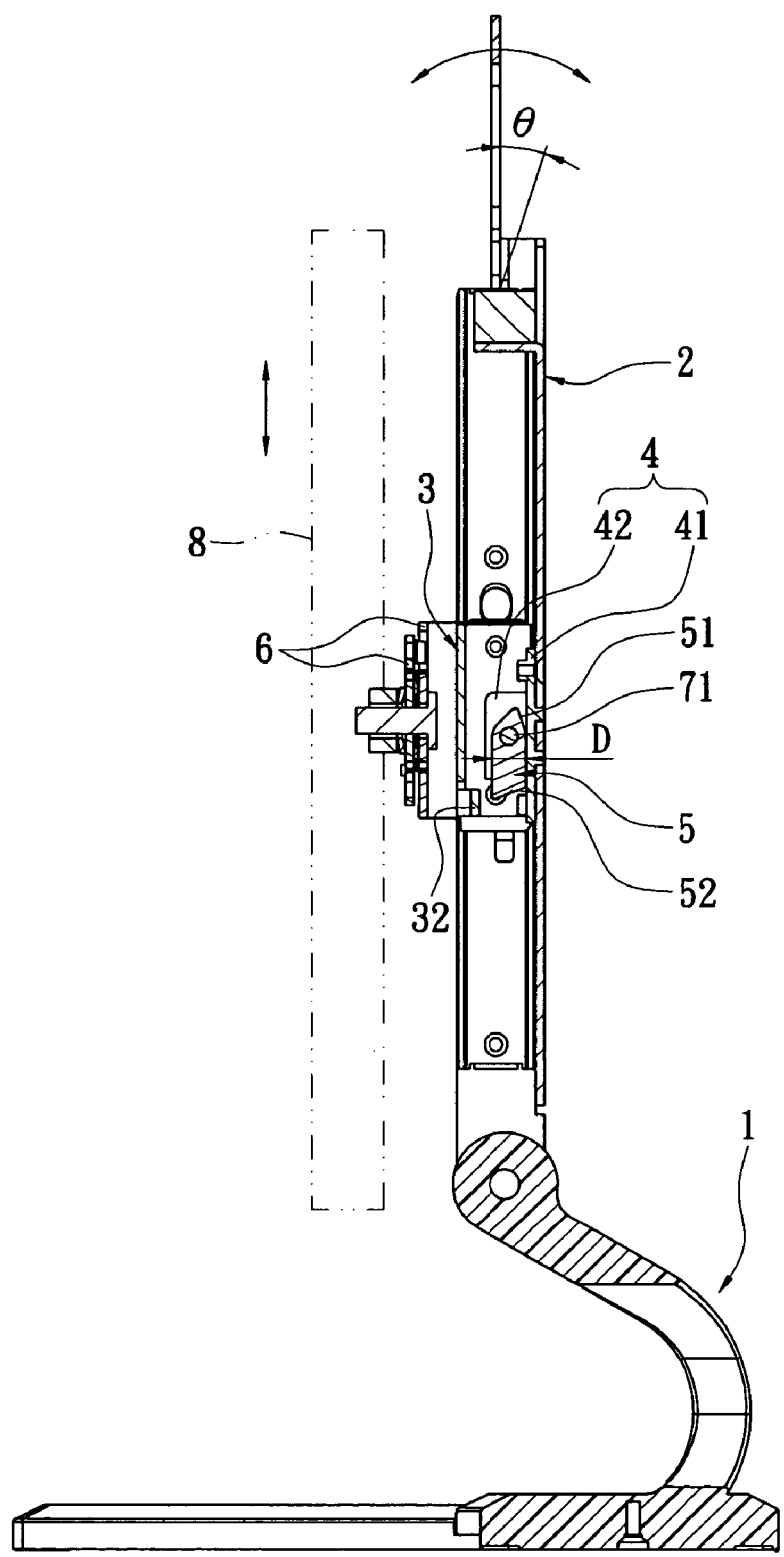
FIG. 6A is a schematic view showing an operating state of the foldable supporting stand with positioning means according to the present invention.
Figure 6B:
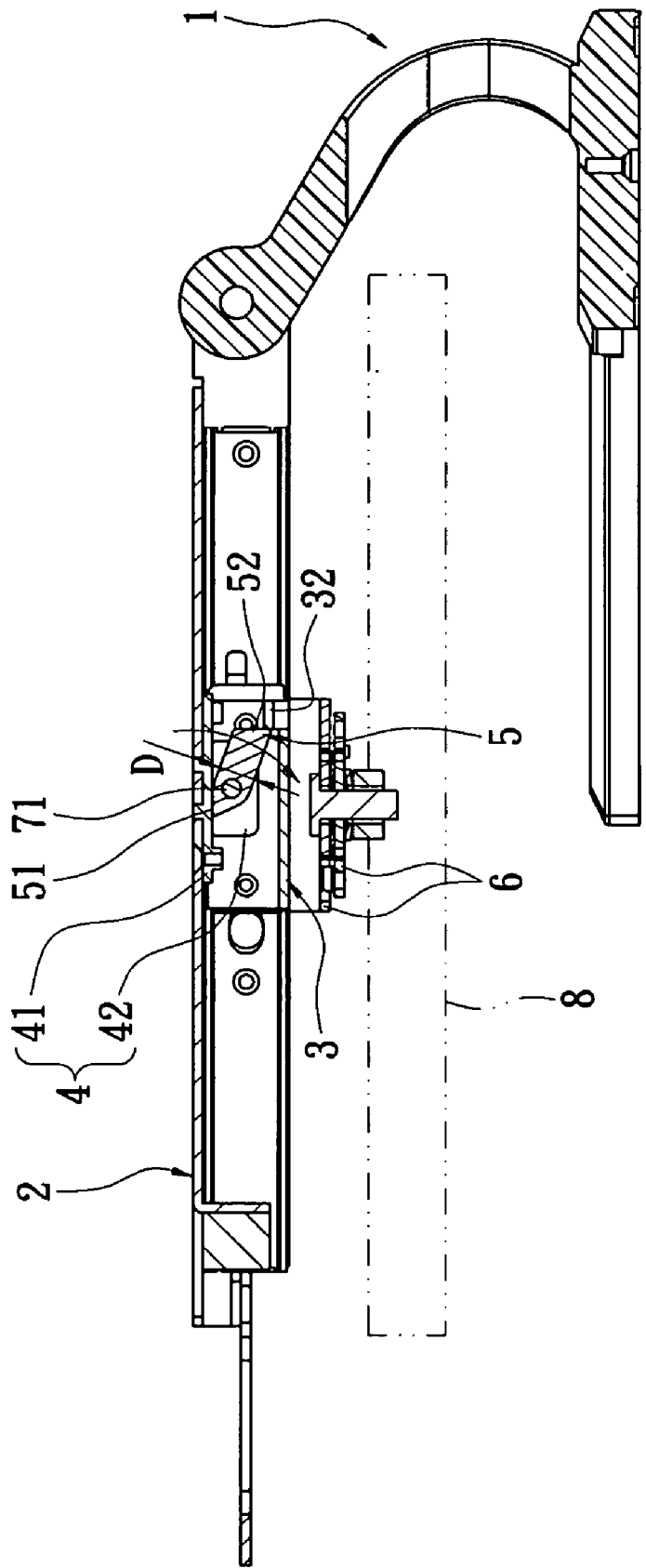
FIG. 6B is a schematic view showing another operating state of the foldable supporting stand with positioning means according to the present invention.

Please refer to FIGS. 6A and 6B. FIG. 6A is a schematic view showing the operating state of the foldable supporting stand with positioning means according to the present invention, and FIG. 6B is a schematic view showing the folded state of the foldable supporting stand with positioning means according to the present invention. When the support 2 erects vertically, that is, the base 1 and the support 2 together form a right angle, since the swinging piece 5 is swingably connected to the rod 71, and both ends of the rod 71 are fixed to the two plates 42 of the positioning means 4 via the through holes 72, the swinging piece 5 naturally move downwards due to its own weight, so that the abutting portion 52 of the swinging piece 5 cannot contact and lock the stopping portion 32 of the sliding body 3. As a result, the sliding body 3 can slide on the support 2 arbitrarily. Since the sliding body 3 is connected to the, screen fixing piece 6, and the screen fixing piece 6 is connected to a screen 8, the screen 8 can be driven to slide upwards and downwards together with the sliding of the sliding body 3, thereby satisfying the user's demand for the height. Further, since the foldable supporting stand with positioning means according to the present invention is designed in such a manner that the bending angle θ of the support 2 is in a range of 35° to −5°, the abutting portion 52 of the swinging piece 5 cannot contact and lock the stopping portion 32 of the sliding body 3. That is to say, the support 2 is folded in a bending angle θ having a range of 35° to −5°, so that the sliding body 3 can slide on the support 2 arbitrarily without being affected.

When the user intends to store and package the supporting stand, in order to facilitate the storage and reduce its volume of storage, the user can fold the support 2 toward the base 1. At this time, the swinging piece 5 swings and slides toward the swinging body 3 due to its own weight, so that the abutting portion 52 of the swinging piece 5 is locked with the stopping portion 32 of the sliding body 3. At this time, the restricting slope 51 of the swinging piece 5 abuts the substrate 41 of the positioning means 4. The restricting slope 51 provides a force for supporting and locking the swinging piece 5, so that the abutting portion 52 of the swinging piece 5 can be locked with the stopping portion 32 of the sliding body 3 firmly. Thus, the sliding body 3 can be restricted from sliding. Therefore, when the foldable supporting stand with positioning means according to the present invention is stored and packaged, the sliding body 3 can be fixed quickly, and the screen 8 connected on the screen fixing piece 6 can be also kept stationary. Thus, the screen 8 can avoid from sliding to suffer damage during its transportation. Further, since the support 2 is folded to the base 1, the volume for package, and the expense of package materials can be reduced, and the quantity of the supporting stands transported can be increased. Further, it has to be mentioned that, the foldable supporting stand with positioning means according to the present invention is designed to have a bending angle θ of the support 2 larger than 35°, the abutting portion 52 of the swinging piece 5 can contact the stopping portion 32 of the sliding body 3. Once contacting, the stopping portion 32 of the sliding body 3 slides to abut the abutting portion 52 of the swinging piece 5, and the restricting slope 51 of the swinging piece 5 approaches gradually the substrate 41 of the positioning means 4. Finally, the restricting slope 51 of the swinging piece 5 abuts the substrate 41 of the positioning means 4. At the same time, the sliding body 3 is restricted from sliding. That is to say, when the support 2 is folded in an angle larger than 35°, the sliding body 3 will be restricted and thus locked on the support 2, so that the sliding body 3 cannot slide any more. However, it should be understood that the range of the bending angle θ of the support 2 can be adjusted by means of increasing the thickness D of the swinging piece 5. When the thickness D of the swinging piece 5 is increased, it means that the abutting portion 52 of the swinging piece 5 can be locked with the stopping portion 32 of the sliding body 3 more easily, that is, the range of the bending angle θ of the support 2 becomes smaller. When the thickness D of the swinging piece 5 is decreased, it means that the abutting portion 52 of the swinging piece 5 will not be locked with the stopping portion 32 of the sliding body 3 easily, that is, the range of the bending angle θ of the support 2 becomes larger.

According to the above, the foldable supporting stand with positioning means of the present invention has advantageous features as follows.

(I) With its own weight serving as a driving force, the swinging piece is driven to swing and lock the sliding body, so that it is not necessary to use a complicated means to achieve the locking action.

(II) When the storing and packaging process is performing, the foldable supporting stand with positioning means of the present invention can fix the screen, the screen can be prevented from shaking and suffering damage during its transportation.

(III) The foldable supporting stand with positioning means of the present invention merely, utilizes simple means and uses its own weight as a driving force to restrict the movement of the screen.

(IV) The foldable supporting stand with positioning means of the present invention can be operated easily and conveniently. Thus, it is of good practicability.

(V) The foldable supporting stand with positioning means of the present invention is simple in structure and thus can save the manufacturing cost and reduce the time for assembling efficiently.

(VI) The foldable supporting stand with positioning means of the present invention can reduce the volume for package greatly. Not only the expense of package materials can be saved, but also the quantity of the supporting stands transported can be increased due to its reduced volume.

While the present invention has been described in terms of what is presently considered to be the most practical and preferred embodiments, it is to be understood that the present invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An adjustable supporting stand, comprising:
a base;
a support rotatably pivoted to the base;
a sliding body slidably provided on the support for selective displacement thereon, the sliding body having a stopping portion extending rearwardly;
a positioning mechanism located rearwardly of the sliding body and coupled to the support; and
a swinging piece swingably connected to the positioning mechanism,
wherein when the support is pivoted forwardly toward the base, the swinging piece is acted upon by gravity to swing downwardly and engages the stopping portion to restrict the sliding body from displacement on the support outwardly from the base.

2. The adjustable supporting stand according to claim 1, wherein left and right sides of the support each extend to respectively form a bent plate, and the bent plate is formed into a groove.

3. The adjustable supporting stand according to claim 2, wherein left and right sides of the sliding body are provided with a plurality of sliding blocks respectively, the sliding blocks being movably inserted into the grooves.

4. The adjustable supporting stand according to claim 1, further comprising a screen fixing piece, the screen fixing piece being joined on the sliding body and sliding together with the sliding body.

5. The adjustable supporting stand according to claim 1, wherein the positioning mechanism comprises a substrate and two plates, the substrate being connected and fixed to the support, the two plates respectively extend from left and right sides of the substrate toward the sliding body.

6. The adjustable supporting stand according to claim 5, wherein the substrate and the two plates are formed integrally in one piece formation.

7. The adjustable supporting stand according to claim 5, further comprising a connecting means, the connecting means being connected between the two plates and the swinging piece, and the swinging piece being swingably connected to the connecting means.

8. The adjustable supporting stand according to claim 7, wherein the connecting means comprises a rod, two through holes and a penetrating hole, the penetrating hole penetrates the swinging piece, the two through holes are provided in the two plates respectively, the rod passes through the penetrating hole and is provided in the swinging piece, both ends of the rod are exposed outside the swinging piece, both ends of the rod are fixed in the two through holes, so that the swinging piece is swingably connected to the positioning mechanism.

9. The adjustable supporting stand according to claim 7, wherein the connecting means comprises two protrusions and two through holes, the two through holes are provided on the two plates, the two protrusions extend from both sides of the swinging piece, the two protrusions are rotatably connected to the two through holes.

10. The adjustable supporting stand according to claim 7, wherein the connecting means comprises two protrusions and two through holes, the two through holes are provided on both sides of the swinging piece, the two protrusions extend from the two plates, the two protrusions are rotatably connected to the two through holes.

11. The adjustable supporting stand according to claim 1, wherein the swinging piece has a restricting slope and an abutting portion, the restricting slope is provided on one end of the swinging piece at a specific angle, the abutting portion is located on the other end of the swinging piece, the abutting portion selectively locks the stopping portion to restrict the sliding body from sliding, the restricting slope selectively abuts the positioning mechanism and thus restricts the swinging range of the swinging piece based on the specific angle.

* * * * *